June 6, 1933.  E. F. MARTIN  1,913,169
WING AND LIKE MEMBER FOR AIRCRAFT
Filed March 27, 1931   2 Sheets-Sheet 1

June 6, 1933.  E. F. MARTIN  1,913,169
WING AND LIKE MEMBER FOR AIRCRAFT
Filed March 27, 1931  2 Sheets-Sheet 2
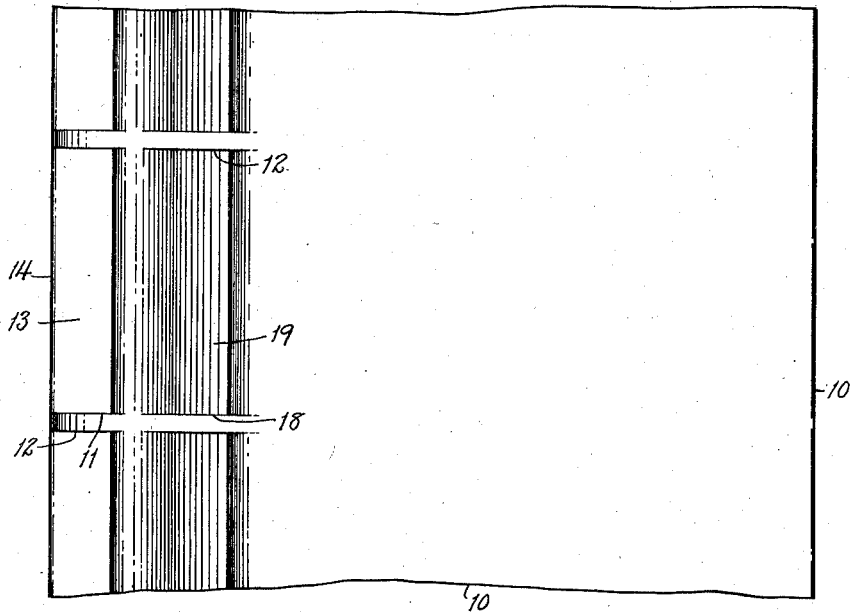
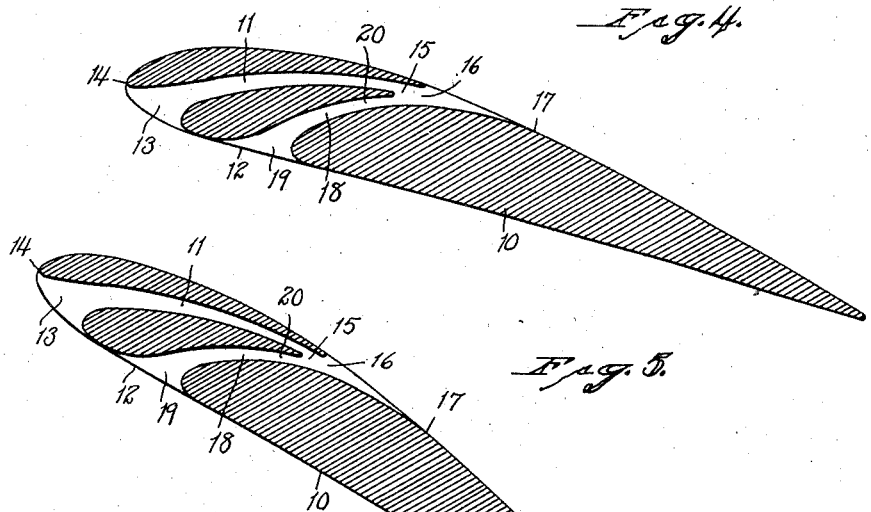
Inventor
Emil F. Martin Patented June 6, 1933

1,913,169

UNITED STATES PATENT OFFICE

EMIL F. MARTIN, OF SEYMOUR, CONNECTICUT

WING AND LIKE MEMBER FOR AIRCRAFT

Application filed March 27, 1931. Serial No. 525,701.

This invention relates to an improvement in wings and like members for aircraft, and particularly to wings, etc., of the type in which air-passages are provided from one face to another to increase the effective lift.

One of the objects of this invention is to provide a wing or like member with means for increasing the lift of such wing, which will remain effective throughout a wide range of variations in the angle of attack.

A further object of my invention is to provide a wing, etc., with two or more air-passages so arranged with respect to each other that air passing through one thereof will act upon the air-stream passing through the other to boost the speed thereof and hence produce a greater lift than though the plurality of such air-passages were acting independently though aggregatively.

With the above and other objects in view as will appear from the following, my invention consists in a wing or similar member for aircraft having certain details of construction and arrangements of parts as will be hereinafter described and particularly recited in the claims.

In the accompanying drawings:

Fig. 3 is a broken under-side view thereof;

Fig. 4 is a transverse sectional view corresponding to Fig. 2 but showing the wing inclined at a greater angle of attack; and Fig. 5 is a similar view but showing the wing inclined at a still greater angle of attack.

The figures above described are schematic in their character and are not intended to illustrate the structural details of a wing since these details may vary widely.

At the outset of the description of my invention, I may state that I am aware that wing structures with plural slots there-through have heretofore been proposed (such, for instance, as is shown in U. S. Patent No. 1,353,666), but by such proposed wings have been limited in their efficiency or have been objectionable or relatively ineffective for other reasons.

Figure 1:
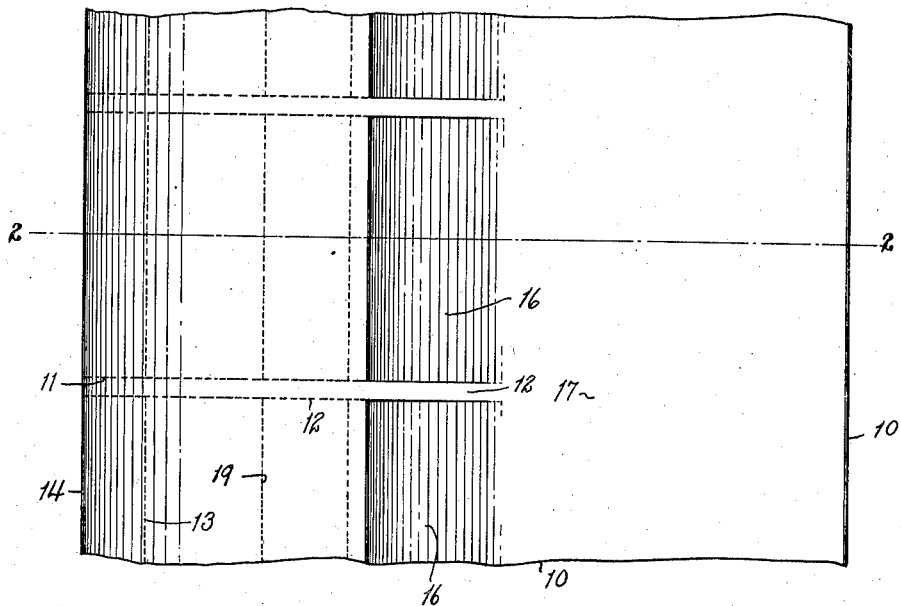
Fig. 1 is a broken top or plan view of one form which an aircraft wing embodying my invention may assume.
Figure 2:
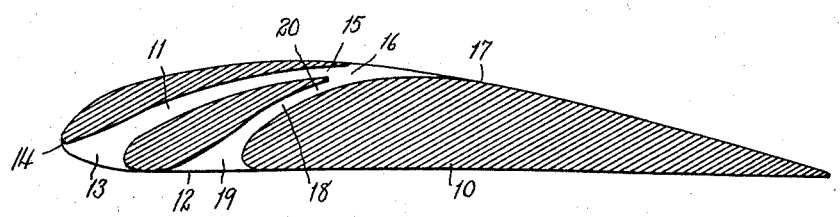
Fig. 2 is a transverse sectional view thereof taken on the line 2—2 of Fig. 1.

In the embodiment of my invention herein chosen for illustration, I employ a wing for aircraft designated as a whole by the numeral 10 and provided near its forward or leading edge with a rearwardly and upwardly inclined curved air-passage 11 which, for the purpose of clarity of description, I shall designate as a "primary" air-passage and which, as shown in Figs. 1 and 3, is interrupted or divided into relatively short sections by ribs or other structural members 12. The ingress opening 13 of the said primary air-passage opens through the under or high-pressure face of the wing and preferably partly intersects the curve of the leading edge 14 thereof, while its upper-rear or egress end 15 opens into a relatively short joint air-passage 16, which is also rearwardly or upwardly inclined and opens through the upper or low-pressure surface 17 of the wing 10.

In conjunction with the forward or primary air-passage 11 just above described, I employ what I shall for convenience of description refer to as a "secondary" air-passage 18, which is also inclined rearwardly and upwardly and is located slightly to the rear of the said primary air-passage 11. The lower forward or ingress end 19 of the said secondary air-passage 18 is preferably arranged as will be seen from the drawings so as to have a different angle of full effectiveness from that of the primary passage 11 for the purpose as will be hereinafter described. The upper rear or egress end 20 of the said secondary passage intersects the joint air-passage 16 already referred to.

By arranging the primary and secondary air-passages 11 and 18 respectively so that the air-stream flowing through each joins with that flowing through the other, before the said streams jointly emerge through the upper- or low-pressure surfaces of the wing, a velocity-boosting action results, which greatly increases the velocity of the relatively-thin film of air flowing over the upper surface of the wing without, however, causing the said film to "burble."

Instead of acting in a purely aggregative manner as might be presumed from a casual study, the so-called "primary" and "secondary" air-passages act as a true combination, as has been satisfactorily proven by wind-tunnel tests which have been conducted by competent experts. These tests demonstrated that, at a certain angle of attack, the front air-passage acting alone gave an increased lifting effect amounting to 70.4% over and above that afforded by the basic wing. The rear air-passage acting alone was found at this same angle of attack to add but 2% lift over and above that afforded by the basic wing.

One of the most interesting facts developed by the tests referred to was the demonstration that when acting together in combination, the two air-passages effected an increase of lift amounting to 91.3% over and above that of the basic wing, whereas the sum of the individual effects of the two air-passages amounted to only 72.4% increased lift. From the foregoing, it is apparent that the interaction between the two said air-passages accounts for approximately 19% increased lift.

Attention is also directed to the novel and preferred arrangement of the ingress ends of the respective air-passages, one of which is arranged so that it is fully effective at a relatively low angle of attack, while the other is arranged to become fully effective at a relatively greater angle of attack. Thus, when the angle of attack is increased beyond a certain point, the forward air-passage becomes less effective, but meanwhile, the complementary rear air-passage is increasing in effectiveness so that at no practical angle of attack is the lifting effect of the air-passages nullified as might be the case were the two air-passages to have their ingress openings so arranged that the full effectiveness of both of them was attained at the same angle of attack.

It is obvious that a wing provided with my improved air-passages may also be equipped, if desired, with auxiliary foils, flap, etc., as is a more or less common practice in aircraft.

It is desirable, of course, under some circumstances, to provide means for closing the respective air-passages when the plane is in full flight, so as to attain the maximum speed, but such closing-mechanism is not in itself necessarily involved with the subject matter of the present application and is therefore reserved to form the subject matter of a separate application.

It will be understood by those skilled in the art that my invention may assume varied physical forms without departing from my inventive concept and I, therefore, do not limit myself to the specific embodiment herein chosen for illustration, but only as indicated in the appended claims.

I claim:

1. A rigid wing or like member for aircraft, provided with means for conducting two streams of air from its high-pressure surface to its upper surface in such manner as to unite the two said air-streams for joint emergence through the said upper surface of the rigid wing at a point forward of the trailing-edge thereof and in a position to boost the velocity of the air-current on the upper surface thereof.

2. A rigid wing or like member for aircraft, provided with two or more inclined air-passages leading from its high-pressure surface and joining into a common air-passage opening through the upper or low-pressure surface of the wing at a point forward of the trailing-edge thereof, to cause an interaction between the air-streams flowing through the respective air-passages and a velocity-boosting action upon the air-current on the upper surface of the wing.

3. A rigid wing or like member for aircraft, provided with two or more inclined air-passages leading from its high-pressure surface and joining into a common air-passage opening through the upper or low-pressure surface of the wing and at a point forward of the trailing-edge thereof, and contracted at their upper ends respectively; whereby an interaction between the air-streams flowing through the respective air-passages is effected to boost the velocity of the air-current on the upper surface of the wing.

4. A rigid wing or like member for aircraft, provided with a pair of air-passages leading from its high-pressure surface and inclined at different angles with respect to each other and joining at their upper ends into a common air-passage opening through the upper or low-pressure surface of the wing at a point forward of the trailing-edge thereof, to cause an interaction between the air-streams flowing through the respective air-passages and a velocity-boosting action upon the air-current on the upper surface of the wing.

5. A rigid wing or like member for aircraft, provided with a pair of air-passages leading from its high-pressure surface and inclined at different angles with respect to each other and joining at their upper ends into a common air-passage opening through the upper or low-pressure surface of the wing, and of a gradually contracted form toward their upper ends respectively, to cause an interaction between the air-streams flowing through the respective air-passages and a velocity-boosting action upon the air-current on the upper surface of the wing.

6. A rigid wing or like member for aircraft, provided with two or more inclined air-passages, both opening through the upper or low-pressure surface of the wing at a point forward of the trailing-edge thereof, and one having its ingress-end intersecting the leading-edge of the wing, and the other being more steeply inclined than the first-mentioned air-passage and having its ingress-opening spaced to the rear of the ingress-opening thereof, whereby said air-passages become fully effective sequentially in the order named as the angle of attack, increases.

7. A rigid wing or like member for aircraft, provided with two or more inclined air-passages leading from its high-pressure surface and joining into a common air-passage opening through the upper or low-pressure surface of the wing at a point forward of the trailing-edge thereof, to cause an interaction between the air-streams flowing through the respective air-passages and a velocity-boosting action upon the air-current on the upper surface of the wing; one of the said air-passages having its ingress-end intersecting the leading-edge of the wing and the other air-passage having its ingress-end located rearwardly of the ingress-end of the first-mentioned passage, whereby said air-passages become fully effective at different angles of attack, respectively.

In testimony whereof, I have signed this specification.

EMIL F. MARTIN.